United States Patent
Robitaille et al.

(10) Patent No.: US 9,887,794 B2
(45) Date of Patent: *Feb. 6, 2018

(54) SIMPLIFIED SYNCHRONIZED ETHERNET IMPLEMENTATION

(71) Applicant: Accedian Networks Inc., Saint-Laurent (CA)

(72) Inventors: Claude Robitaille, St-Placide (CA); Steve Rochon, Brossard (CA); Yanick Viens, St-Jean-sur-Richelieu (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,043

(22) Filed: Feb. 13, 2017

(65) Prior Publication Data
US 2017/0155459 A1 Jun. 1, 2017

Related U.S. Application Data

(63) Continuation of application No. 14/661,752, filed on Mar. 18, 2015, now Pat. No. 9,608,751.

(51) Int. Cl.
*H04J 3/06* (2006.01)
(52) U.S. Cl.
CPC .......... *H04J 3/0658* (2013.01); *H04J 3/0641* (2013.01)
(58) Field of Classification Search
CPC ............ H04J 3/0641; H04J 3/06; H04L 12/40
See application file for complete search history.

(56) References Cited

U.S. PATENT DOCUMENTS

| 6,978,460 | B2 | 12/2005 | Arakawa | |
| 7,873,073 | B2 | 1/2011 | Frian | |
| 7,966,510 | B2 | 6/2011 | Harrison | |
| 8,619,755 | B2 | 12/2013 | Wang | |
| 8,737,389 | B2 | 5/2014 | Chiesa | |
| 9,112,630 | B1 * | 8/2015 | Mizrahi | ................ H04J 3/0641 |

(Continued)

FOREIGN PATENT DOCUMENTS

| EP | 2377256 | 7/2009 |
| EP | 2502372 | 5/2011 |

(Continued)

*Primary Examiner* — Mohamed Kamara
(74) *Attorney, Agent, or Firm* — Nixon Peabody LLP

(57) ABSTRACT

A method of simplifying the implementation of Synchronous Ethernet on an Ethernet device having a first port and a second port device using a predetermined protocol and signaling, comprises delivering a master clock from a Synchronous Ethernet system to the first port of the Ethernet device; transmitting the delivered master clock to the second port of the Ethernet device independently of the protocol and signaling of the Ethernet device; and transmitting the master clock from the second port of the Ethernet device to a downstream device that supports Synchronous Ethernet. In one implementation, the Ethernet device has a local clock, and the method synchronizes the local clock to the master clock. In another implementation, the Ethernet device does not have a local clock, and the master clock is transmitted from the second port of the Ethernet device to the downstream device without any synchronizing operation at the Ethernet device.

14 Claims, 5 Drawing Sheets

(56) References Cited

U.S. PATENT DOCUMENTS

| | | |
|---|---|---|
| 2002/0129227 A1 | 9/2002 | Arakawa |
| 2008/0232527 A1 | 9/2008 | Barkan |
| 2009/0142062 A1 | 6/2009 | Harrison |
| 2009/0213873 A1 | 8/2009 | Frlan |
| 2011/0150008 A1 | 6/2011 | Le Pallec |
| 2011/0170534 A1 | 7/2011 | York |
| 2011/0185215 A1 | 7/2011 | Neben |
| 2011/0191621 A1 | 8/2011 | Harrison |
| 2011/0200051 A1* | 8/2011 | Rivaud ............... H04J 3/0641 370/400 |
| 2011/0255546 A1 | 10/2011 | Le Pallec |
| 2011/0261842 A1 | 10/2011 | Beili |
| 2011/0261917 A1 | 10/2011 | Bedrosian |
| 2011/0305165 A1 | 12/2011 | Wang |
| 2011/0305173 A1 | 12/2011 | Wang |
| 2012/0257700 A1 | 10/2012 | Belisomi |
| 2012/0301134 A1 | 11/2012 | Davari |
| 2013/0083809 A1 | 4/2013 | Renaux |
| 2013/0089170 A1 | 4/2013 | Chiesa |
| 2013/0107897 A1 | 5/2013 | Bui |
| 2013/0121705 A1 | 5/2013 | Le Pallec |
| 2013/0183905 A1 | 7/2013 | Richardson |
| 2013/0202291 A1 | 8/2013 | Cavaliere |
| 2013/0207841 A1 | 8/2013 | Negus |
| 2013/0229982 A1* | 9/2013 | Ma ....................... H04W 56/00 370/328 |
| 2013/0293419 A1 | 11/2013 | Negus |
| 2013/0308658 A1 | 11/2013 | Le Pallec |
| 2014/0036903 A1 | 2/2014 | Ryan |
| 2014/0044133 A1 | 2/2014 | Wang |
| 2015/0222413 A1* | 8/2015 | Pietilainen ............ G06F 1/14 709/248 |
| 2016/0065322 A1 | 3/2016 | Cao |
| 2016/0156427 A1 | 6/2016 | Yang |

FOREIGN PATENT DOCUMENTS

| | | |
|---|---|---|
| EP | 2333993 A1 | 6/2011 |
| EP | 2337251 A1 | 6/2011 |
| EP | 2487819 A1 | 8/2012 |
| EP | 2541815 A1 | 1/2013 |
| EP | 2701309 A1 | 2/2014 |
| WO | WO 2010/066664 A1 | 6/2010 |
| WO | WO 2011/060965 A1 | 5/2011 |
| WO | WO 2011/072973 A1 | 6/2011 |

* cited by examiner

SIMPLIFIED SYNCHRONIZED ETHERNET IMPLEMENTATION

CROSS REFERENCE TO RELATED APPLICATIONS

This application is a continuation of and claims priority to U.S. patent application Ser. No. 14/661,752, filed Mar. 18, 2015, now allowed, which is hereby incorporated by reference herein in its entirety.

FIELD OF THE INVENTION

The present disclosure relates to synchronous Ethernet on two-port devices.

SUMMARY

In accordance with one embodiment, a method is provided to simplify the implementation of Synchronous Ethernet on an Ethernet device having a first port and a second port device using a predetermined protocol and signaling. The method comprises delivering a master clock from a Synchronous Ethernet system to the first port of the Ethernet device; transmitting the delivered master clock to the second port of the Ethernet device independently of the protocol and signaling of the Ethernet device; and transmitting the master clock from the second port of the Ethernet device to a downstream device that supports Synchronous Ethernet. In one implementation, the Ethernet device has a local clock, and the method synchronizes the local clock to the master clock. In another implementation, the Ethernet device does not have a local clock, and the master clock is transmitted from the second port of the Ethernet device to the downstream device without any synchronizing operation at the Ethernet device.

At least one of the ports of the Ethernet device may be adapted to recognize that a master clock has been received by the Ethernet device, and then forward the received master clock to the other of the ports for transmission to the downstream device. The other port may be configured to transmit the master clock to the downstream device. Each of the ports may be adapted to recognize that a master clock has been received by the Ethernet device, and then forward the received master clock to the other of the ports for transmission to the downstream device. The first and second ports may include state machines, which may be the same on both of the ports.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
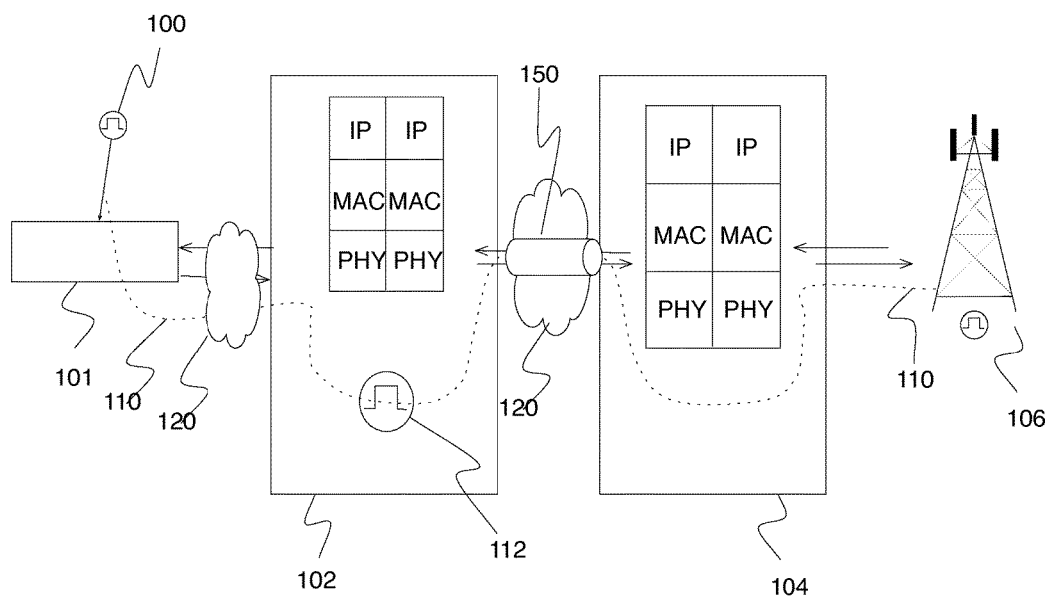
FIG. 1 is a diagrammatic illustration of a typical clock exchange in Ethernet networks.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

REFERENCES

[1] International Telecommunication Union (ITU)—Packet over transport aspects. G.8264/Y.1364. May 2014
[2] International Telecommunication Union (ITU)—Timing characteristics of a synchronous Ethernet equipment slave clock. G.8262/Y.1362. January 2015

DETAILED DESCRIPTION

Synchronous Ethernet (Sync-E) [2] is becoming widely deployed in networks. FIG. 1 illustrates a standard Sync-E ecosystem comprising a Sync-E master clock 100, also referred to as a Primary Reference Clock (master clock), that is transmitted by a master device 101. The master clock is transmitted over synchronized network by a master device 101 to Ethernet devices 102, 104, 106 in a path 110. The Ethernet device 102 synchronizes its local clock 112 based on the transmitted master clock 110 and forwards the master clock to other Ethernet devices 104, 106 downstream over one or more links 150 as per a predetermined configuration over a network 120.

Each Ethernet device can be a simple low-cost two-port Ethernet device, such as a two-port Network Interface Device (NID). The simple device is required to at least transmit the master clock to a downstream device supporting Sync-E, even if it does not need to maintain a local clock synchronized, or does not even have a local clock.

Figure 2:
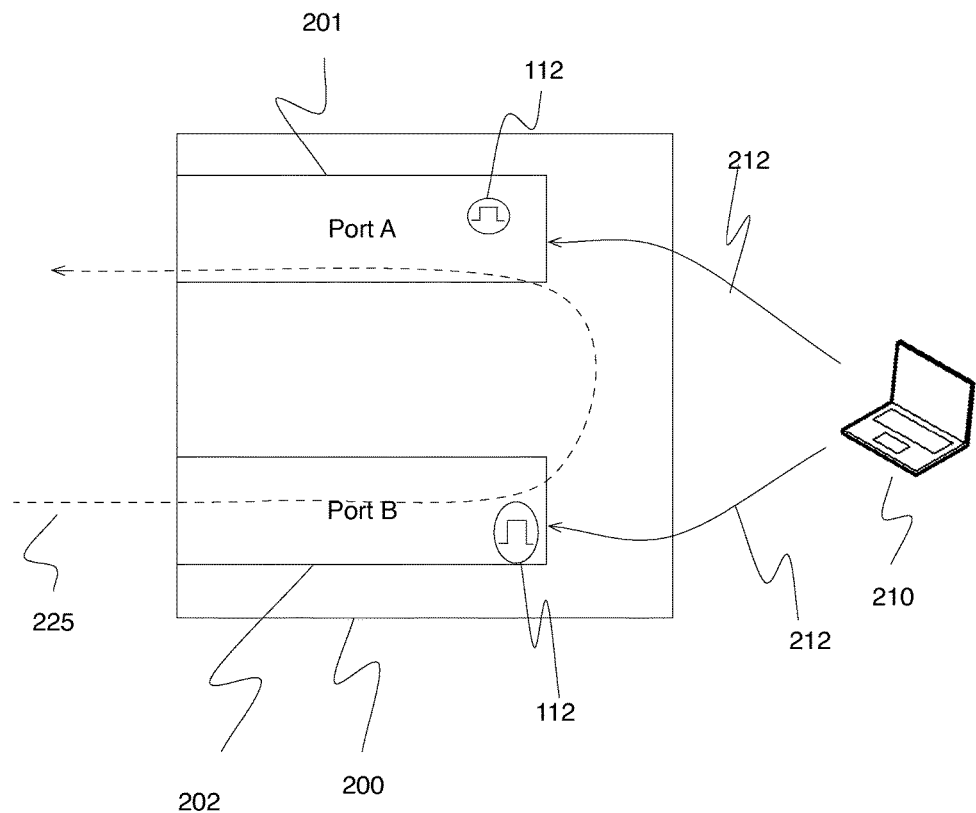
FIG. 2 is a diagrammatic illustration of the clock flow in a two-port Ethernet device.

FIG. 2 shows a well known two-port Ethernet device 200 with port A 201 and port B 202. The two-port device has been configured by a network management system 210 via a network management channel 212 to receive a master clock 225 on port B 202 and optionally synchronize the local clock 112 before transmitting the master clock to port A 201 back in the network. A standard Ethernet Synchronization Messaging Channel (ESMC) [1] may also be used to configure the status of the ports via signaling.

Port B 202 is required to implement additional logic to recognize that a master clock 225 has been received and that port B 202 is configured to synchronize the local clock 112 and then forward the master clock to port A for downstream transmission. Meanwhile, port A 201 is configured to execute a different state machine to simply forward the master clock to the downstream device.

When there is a failure in the master clock path 225, the state machine of port B 202 recognizes the failure and implements the proper actions from the protocol [1]. The configuration of the two-port device may need to be changed to make port A 201 responsible for receiving, synchronizing and forwarding the master clock which is now on path 230. The re-configuration may be done using a network management system 210 or via the ESMC signaling protocol.

The two-port devices are generally small and low-cost, but the additional logic required to configure and process the master clock and ESMC increases the cost and complexity. There is a need to reduce the logic and implementation complexity such as external configuration.

Figure 3:
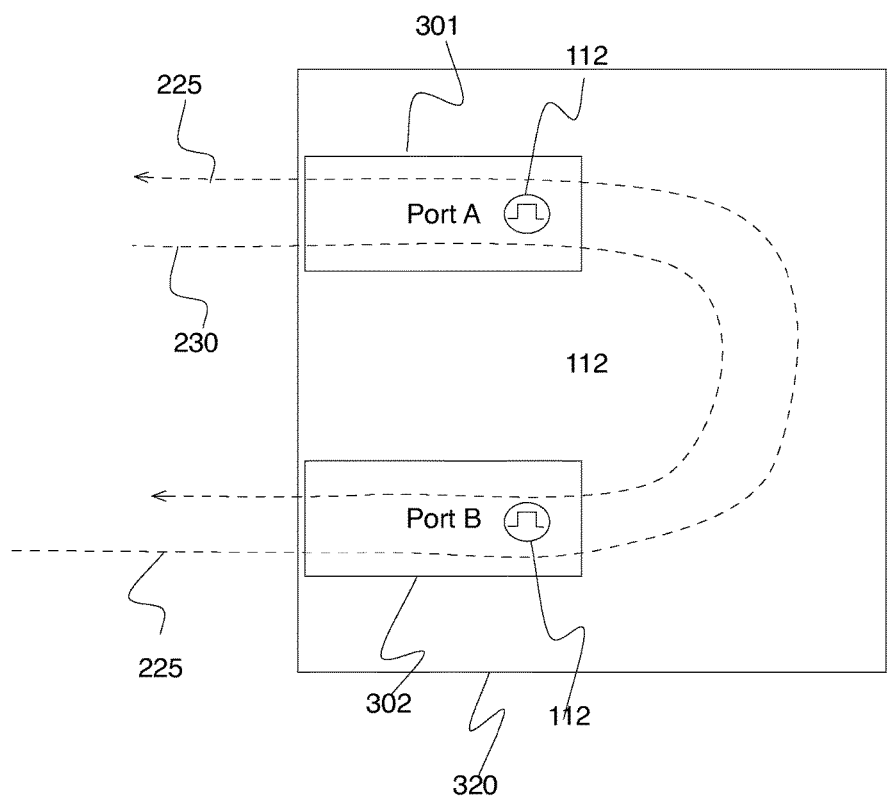
FIG. 3 is a diagrammatic illustration of simplified clock synchronization in a two-port Ethernet device.

Referring to FIG. 3, a two-port device 320 includes a state machine 300 that is the same on both ports 301, 302. The state machine does not need to be configured or modified. When a master clock is received 225, 230 on a first port 301 or 302, it is always transmitted to the second port 302 or 301. The two-port device can act independently of the protocol and signaling and always maintain its clock 112 synchronized, if required, with minimal additional logic. For example, when a two-port device with port A and port B receives a master clock from port A, it sends it automatically to port B for transmission to a downstream device. Similarly, when a master clock is received on port B, it is sent automatically to port A for transmission to a downstream device.

The ESMC protocol is carried transparently by the two-port device and no configuration is required, thereby reducing cost and complexity for the two-port device significantly.

Figure 4:
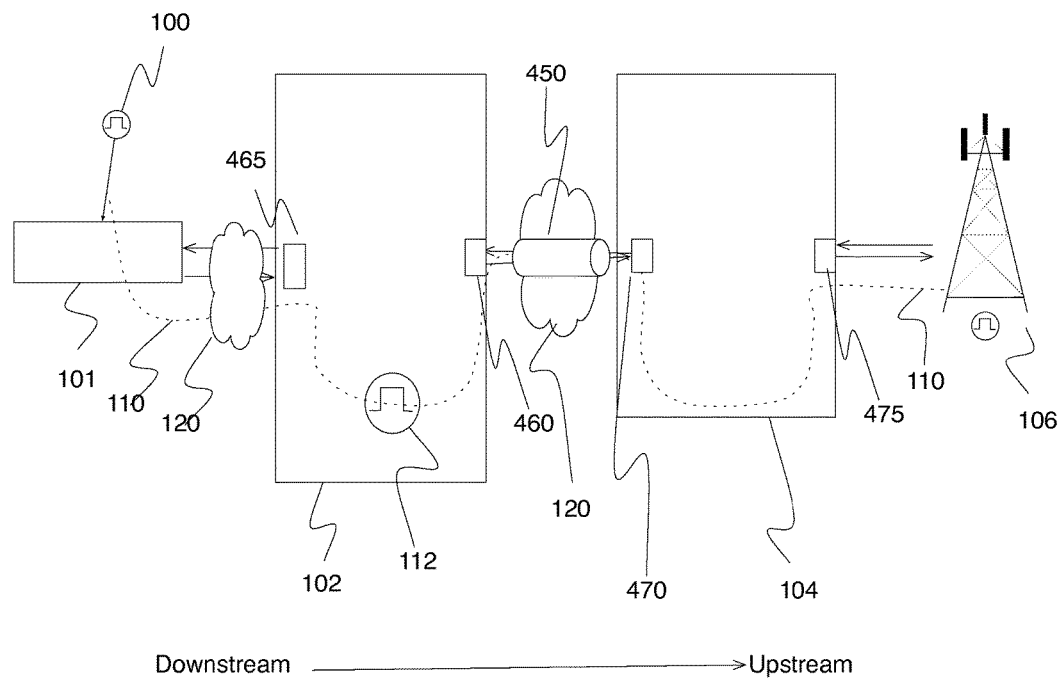
FIG. 4 is a diagrammatic illustration of a typical clock exchange in Ethernet networks including a 1000base-T link.

As another embodiment, referring to FIG. 4, when the link 450 between two devices 102, 104 is 1000base-T, the PHY layer clocking aspect is managed by a master-slave process. One port (e.g., 460 or 465) is selected as a master and one as the slave (e.g., 470 or 475). The slave 470 extracts the clock in data received from the master 460 and synchronizes its transmission 475 using that clock. The clock is also forwarded to other devices downstream 106. Existing standards (e.g. 1000base-T) can be implemented to force which end of the link is the master, the auto-negotiation between the devices 102, 104 is used to force which end of the link is the master.

The device may receive and transmit ESMC frames (e.g., because another port uses the SYNC-E protocol) in a path 110. The ESMC frame includes quality level (QL) information relating to the quality of the reference clock. In one embodiment, the QL is be used to select which end of the link is the best slave and master.

Figure 5:
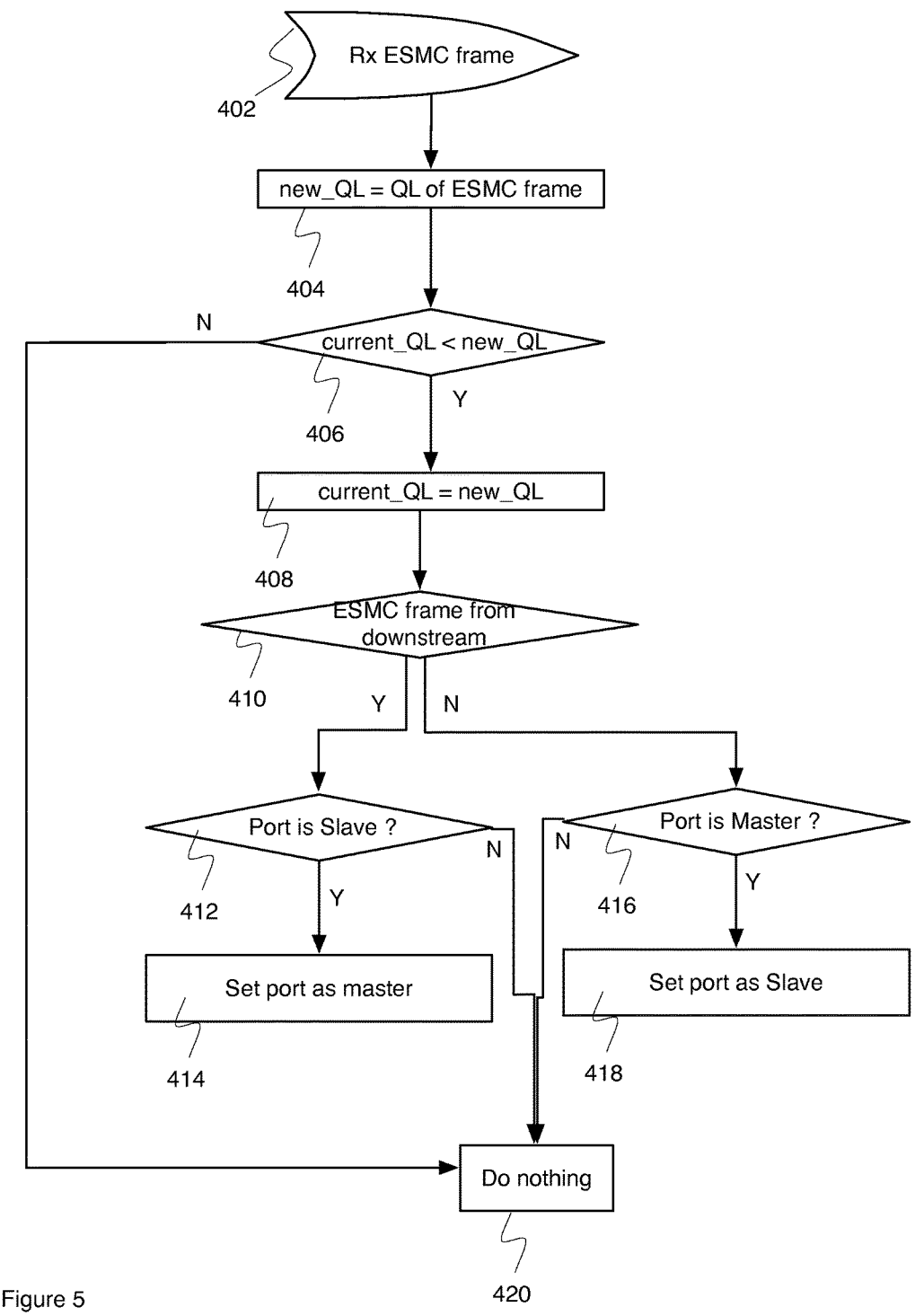
FIG. 5 is a flow chart of a process to select a master and slave based on clock quality.

The selection of the master port changes based on the quality of the clock received, as exemplified by the process illustrated by the flow chart in FIG. 5. The process is executed on both ends of a link 460, 470, but to simplify the explanation, it will be assumed that the process is implemented on port 460. In this case, port 460 receives an ESMC from downstream, it has been sent by another port 465 on the device 102. If the port 460 receives the ESMC from upstream, it has been sent from the port 470 at the other end of the link 450 on device 104. At initialization, the master and slave ports, between port 460 and 470, are assigned randomly or manually configured.

A variable current_QL is used to maintain the current quality level of the ESMC. It is initialized to the lowest quality value possible. When an ESMC frame is received at the port at step 402 in the process illustrated in FIG. 5, a variable new_QL is set to the QL of the received ESMC frame at step 404. Step 406 then determines whether current_QL<new_QL, and if the answer is affirmative, the clock quality in the received ESMC frame is better than what was previously received, and thus current_QL is then set to new_QL at step 408. If the answer at step 406 is negative, nothing is changed at step 420

Step 410 determines whether the ESMC frame is received from downstream (e.g, from port 465). If the answer is affirmative, step 412 determines whether the port 460 is already set as a slave, and if it is the port 460 is set as the master at step 414. Otherwise the status remains as slave, and nothing is changed at step 420. A negative answer at step 410 means the ESMC frame is received from upstream 410 (e.g., from the device 140 at the other end of the link 450) and step 416 determines whether the port is set as a master. If the answer is affirmative, the setting of the port is changed to slave status at step 418. Otherwise, the status remains as master, and nothing is changed at step 420. At the same time, the process running on the other side of the link 470 changes that port status to master. This way the port with the best clock quality is used as the master, and the other one is the slave (IEEE 802.3 clause 40).

At initialization, the slave can remain unchanged for a predetermined amount of time (e.g., 5 seconds or after a number of ESMC frames are received by each port) to avoid changing the slave and master assignment several times while the signal stabilizes in line with G.8262 standards.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A synchronous ethernet device comprising:
   a first port comprising a first state machine; and
   a second port comprising a second state machine;
   the first port and the second port using a predetermined signaling protocol;
   wherein,
      when a master clock is received from the synchronous ethernet system to the first port:
         the master clock is transmitted to the second port independently of the predetermined signaling protocol, and
         the master clock is transmitted from the second port to a downstream device that supports synchronous ethernet; and
      when the master clock is received from the synchronous ethernet system to the second port:
         the master clock is transmitted to the first port independently of the predetermined signaling protocol, and
         the master clock is transmitted from the first port to a downstream device that supports synchronous ethernet.

2. The device of claim 1 further comprising a local clock which synchronizes to the master clock.

3. The device of claim 1 in which said ethernet device does not have a local clock, and said master clock is transmitted from said first or second port to said downstream device without any synchronizing operation at said ethernet device.

4. The device of claim 1 in which at least one of said first and second ports is configured to recognize that the master clock has been received.

5. The device of claim 1, wherein said first and second state machines are the same on both of said first and second ports.

6. The device of claim 1, wherein one of the first port or the second port is selected as a master and one as a slave, and the slave extracts the clock in data received from the master and synchronizes its transmission using that clock.

7. The device of claim 6, wherein selection of the master port changes based on quality of the clock received.

8. The device of claim 1, wherein an Ethernet Synchronization Messaging Channel (ESMC) is carried transparently by the device.

9. A method to simplify the implementation of Synchronous Ethernet on an Ethernet device having a first port and a second port using a signaling protocol, said method comprising:
   assigning one of the first and second port as a master port and the other one of said first and second port as a slave port; and
   when a master clock is delivered from a Synchronous Ethernet system to the master port of said Ethernet device:
   transmitting the delivered master clock to the slave port of said Ethernet device independently of the signaling protocol of said Ethernet device; and
   transmitting said master clock from said slave port of said Ethernet device to a downstream device that supports Synchronous Ethernet.

10. The method of claim 9, wherein assigning the master port and slave port is based on quality of the clock received.

11. The method of claim 9 in which said Ethernet device has a local clock and further comprising synchronizing the local clock to said master clock.

12. The method of claim 9 in which said Ethernet device does not have a local clock, and said master clock is transmitted from said first or second port of said Ethernet device to said downstream device without any synchronizing operation at said Ethernet device.

13. The method of claim 9, wherein said first and second ports comprise state machines.

14. The method of claim 13, wherein said state machines are the same on both of said ports.

* * * * *